(12) United States Patent
Monroe et al.

(10) Patent No.: US 8,082,663 B1
(45) Date of Patent: Dec. 27, 2011

(54) METHOD FOR HERMETIC ELECTRICAL CONNECTIONS

(75) Inventors: Saundra L. Monroe, Tijeras, NM (US); S. Jill Glass, Albuquerque, NM (US); Ronnie G. Stone, Albuquerque, NM (US); Jamey T. Bond, Albuquerque, NM (US); Donald F. Susan, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 517 days.

(21) Appl. No.: 12/268,667

(22) Filed: Nov. 11, 2008

Related U.S. Application Data

(60) Provisional application No. 60/987,120, filed on Nov. 12, 2007.

(51) Int. Cl.
    *H01R 43/00* (2006.01)
(52) U.S. Cl. .......... 29/825; 29/876; 29/877; 29/878; 174/50.61; 361/518
(58) Field of Classification Search .......... 29/825, 29/976, 977, 978, 876, 877, 878; 174/50.61; 361/518
See application file for complete search history.

(56) References Cited

U.S. PATENT DOCUMENTS

| | | | | |
|---|---|---|---|---|
| 2,210,699 A | * | 8/1940 | Bahis | 174/50.56 |
| 2,284,151 A | * | 5/1942 | Kingston | 439/692 |
| 2,446,277 A | * | 8/1948 | Gordon | 174/50.63 |
| 3,141,753 A | * | 7/1964 | Certa | 65/59.34 |
| 3,336,433 A | * | 8/1967 | Johnson et al. | 174/50.61 |
| 3,646,405 A | * | 2/1972 | Wallis et al. | 361/518 |
| 3,858,378 A | * | 1/1975 | Allen et al. | 403/30 |
| 4,115,629 A | * | 9/1978 | Dey et al. | 429/56 |
| 4,277,716 A | * | 7/1981 | Banks, Jr. | 313/623 |
| 4,657,337 A | * | 4/1987 | Kyle | 439/887 |
| 5,093,989 A | * | 3/1992 | Beltz | 29/878 |
| 5,820,989 A | * | 10/1998 | Reed et al. | 428/426 |
| 7,123,440 B2 | | 10/2006 | Albrecht et al. | |
| 7,364,451 B2 | | 4/2008 | Ring et al. | |
| 7,442,081 B2 | | 10/2008 | Burke et al. | |

OTHER PUBLICATIONS

J. Rodelas, S. Monroe, S. J. Glass, C. Watson, R. Stone, D. Susan, T. Jones & J. Bond, May 20-23, 2007, ACerS 2007 Glass & Optical Materials Division Meeting & 18th University Conference on Glass,Rochester, NY.

C. J. Leedecke and H. K. Baca, "Glass-ceramics for sealing to Pd-Ag Alloys," Sandia Technical Report, SAND79-0248, Sandia National Laboratories, Albuquerque, NM, 1979.

\* cited by examiner

*Primary Examiner* — Carl Arbes
(74) *Attorney, Agent, or Firm* — Elmer A. Klauetter; Kevin W. Bieg

(57) ABSTRACT

A method of providing a hermetic, electrical connection between two electrical components by mating at least one metal pin in a glass-ceramic to metal seal connector to two electrical components, wherein the glass-ceramic to metal seal connector incorporates at least one metal pin encased (sealed) in a glass-ceramic material inside of a metal housing, with the glass-ceramic material made from 65-80% $SiO_2$, 8-16% $Li_2O$, 2-8% $Al_2O_3$, 1-5% $P_2O_5$, 1-8% $K_2O$, 0.5-7% $B_2O_3$, and 0-5% ZnO. The connector retains hermeticity at temperatures as high as 700° C. and pressures as high as 500 psi.

11 Claims, 3 Drawing Sheets

METHOD FOR HERMETIC ELECTRICAL CONNECTIONS

RELATED APPLICATIONS

This application claims the benefit of U.S. Provisional Application No. 60/987,120, filed on Nov. 12, 2007.

This invention was made with Government support under Contract No. DE-AC04-94AL85000 awarded by the Department of Energy. The Government has certain rights in the invention.

BACKGROUND OF THE INVENTION

The invention relates to a method for making an electrical connection, and more particularly, to a method of using a glass-ceramic to metal seal for making an electrical connection that is hermetic at elevated temperatures and/or pressures.

Co-axial single pin or multiple-pin connectors featuring hermetic electrical feedthroughs utilize glass for electrical isolation and to form a seal between the metal housing and the metal feedthrough (pin). Robust, hermetic glass-to-metal seals are designed to minimize residual tensile stresses in the glass that arise due to coefficient of thermal expansion (CTE) mismatch between the materials. Common design practice is to minimize the tensile stresses that develop on cooling to temperatures near room temperature. When a glass-to-metal seal is exposed to an elevated thermal environment that can also produce a pressure gradient across the seal, tensile stresses may occur due to the thermo-mechanical strain history of the seal and the CTE mismatch. If glass tensile stresses exceed design limits, cracking can jeopardize seal hermeticity. Geometrical design modifications are one approach to minimize tensile stresses and enhance reliability. Another option is to replace the glass with a glass-ceramic. In addition to increased strength and more refractory behavior of the glass ceramic, its CTE can be altered over a relatively broad range by changes in heat treatment thus allowing the CTE to be a closer match to the CTE of the housing or the pin. Optimization of the glass-ceramic CTE, in conjunction with optimization of design geometry, offers a means to further reduce CTE mismatch-induced residual stresses.

Electrical connectors with hermetic seals are used in aerospace applications, such as communications satellites, microwave communications equip, and military communications and radar systems. A hermetic seal is required for these applications to prevent contamination and corrosion of the electrical connection and other environmentally sensitive components inside the device. Other applications include the use in the automotive industry and commercial communications. Some applications have the potential for harsh operating environments in which the connectors must maintain reliable electrical connectivity and hermeticity. While commercial seal connectors are available that can operate under benign conditions of atmospheric pressure and ambient temperatures, some applications require that hermeticity and electrical connectivity be maintained at both elevated temperatures and pressures The present invention addresses these requirements.

DESCRIPTION OF SPECIFIC EMBODIMENTS

In one embodiment of the method of the present invention, a glass-ceramic to metal seal connector is used to provide a hermetic electrical connection between two electrical components with the glass-ceramic to metal seal connector made from a metal pin encased (sealed) in a glass-ceramic material that is in turn housed in a metal material that has a coefficient of thermal expansion (CTE) equal to or higher than the CTE of the glass-ceramic material at the operating conditions of interest. The metal pin provides the means for electrical connectivity between the two electrical components. In another embodiment, multiple metal pins are used in the electrical hermetic connection, with each pin sealed in a glass-ceramic material sealed to a metal housing. The electrical connectivity and hermeticity can be maintained at both elevated temperatures and pressures.

Figure 1:
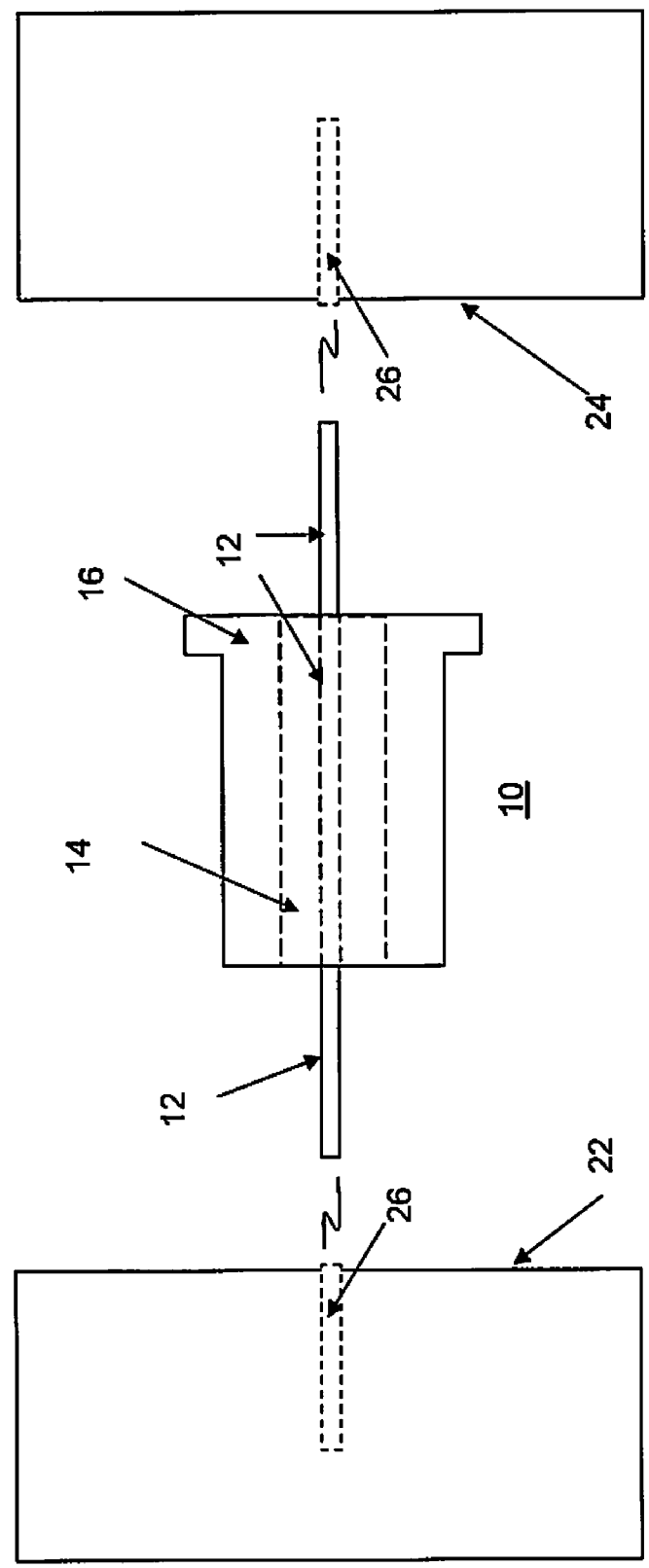
FIG. 1 shows an illustration of a single-pin glass-ceramic to metal seal connector providing hermetic, electrical connection to two electrical components.

An illustration of one embodiment of the configuration of the electrical connectivity of the elements of the present invention is shown in FIG. 1, with only one pin shown. The metal pin 12 is encased in a glass-ceramic material 14, which is sealed to a metal casing 16. In one embodiment, the metal casing or housing has a circular cross section, as does the glass and the pin. The metal pin extends through the glass-ceramic material and the metal casing and provides electric connectivity to the two electric components 22 and 24 when the metal pin 12 is mated to those components by inserting the pin into the mating holes 26 in each of the electric components.

Figure 2:
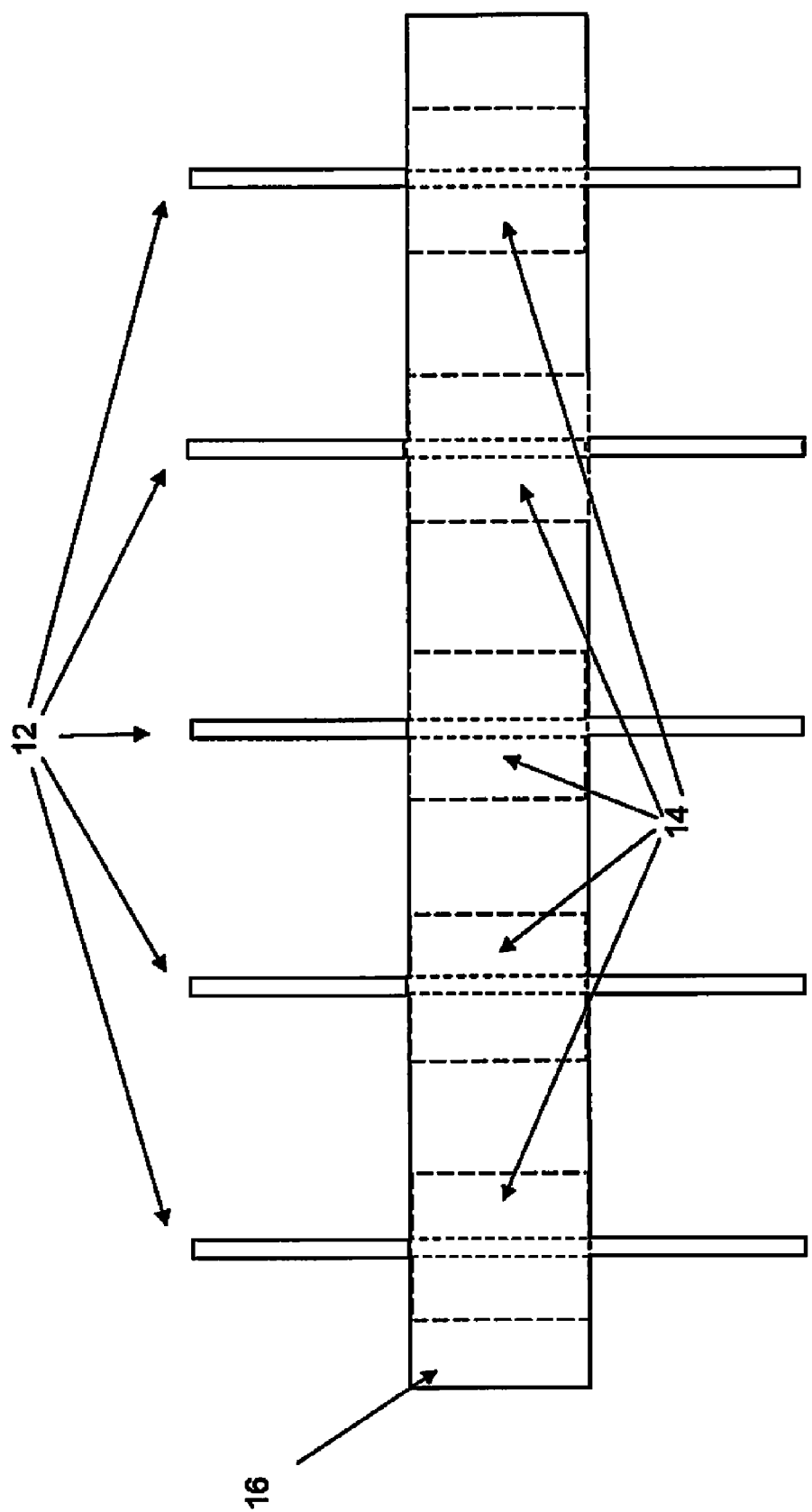
FIG. 2 shows an illustration of a 5-pin glass-ceramic to metal seal connector that can be used to provide hermetic electrical connection to two electrical components.
Figure 3:
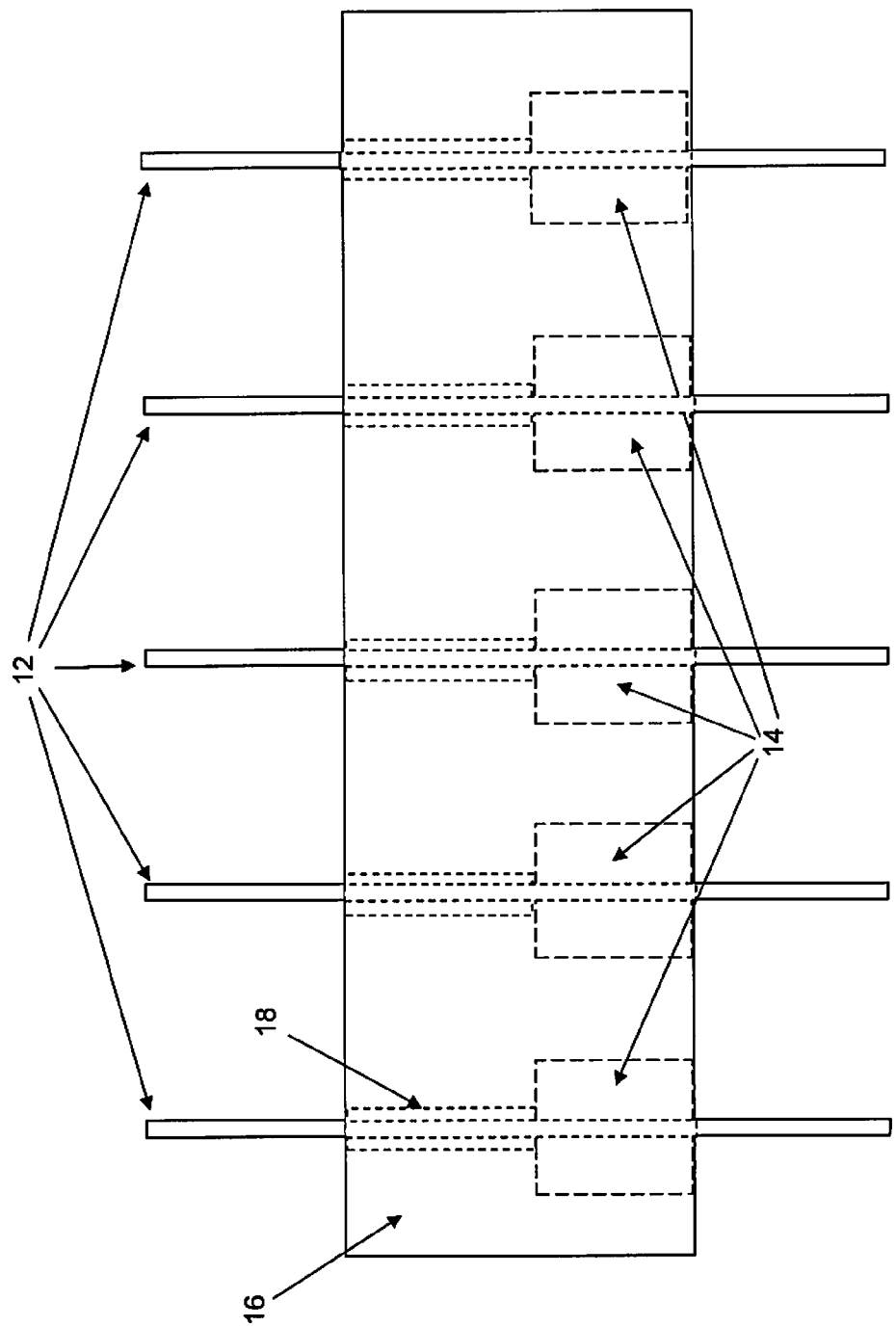
FIG. 3 shows an illustration of another embodiment of a 5-pin glass-ceramic to metal seal connector that can be used to provide hermetic electrical connection to two electrical components.

In another embodiment, a hermetic seal and electrical connectivity is made between two electrical components using a 5-pin glass-ceramic to metal seal connector. An illustration of the 5-pin glass-ceramic to metal seal connector is shown in FIG. 2. In FIG. 2, the glass-ceramic material 14 extends through the metal casing 16. However, in another embodiment, the glass-ceramic material 14 extends only partially through the metal casing 16 with the metal pin 12 extending through the glass-ceramic material and then through a cavity 18 in the metal casing to extend on both sides of the metal casing, as depicted in FIG. 3. In another embodiment, the cavity 18 in the metal casing 16 can utilize a non-conductive sleeve, such as a ceramic or plastic sleeve, with the cavity that surrounds the metal pin, providing isolation of the metal pin from the metal casing.

In making a strong chemical bond between a metal and a glass or glass ceramic, it is not only essential that the expansion characteristics of the alloy and the glass be sufficiently well matched to reduce residual stress in the seal, but it is equally desirable that the glass have the highest possible corrosion resistance and good bond with the pin and housing metal. It is also important that the melting temperature of the glass be sufficiently low to permit production of the glass or glass ceramic in conventional furnaces. It is also desirable that the expansion and viscosity be such that the glass is capable of sealing to nickel-base alloys and stainless steels. It is further desirable that the glass have a high mechanical strength so that the hermetic seal can withstand high external stresses such as a pressure gradient across the seal. The glass-ceramic material of the present invention is known in the art (see Reed et al., U.S. Pat. No. 5,820,989) and is comprised of $SiO_2$ (65-80%), $Li_2O$ (8-16%), $Al_2O_3$ (2-8%), $P_2O_5$ (1-5%), $K_2O$ (1-8%), $B_2O_3$ (0.5-7%), and $ZnO$ (0-5%). High-strength seals can also be made using 304 stainless steel as well as nitronic stainless steel in the metal housing or casing and other stainless steel alloys with the disclosed glass ceramic of the present invention by belt processing.

The metal pin can be made of any electrically conductive metal with sufficient hardness and a CTE approximately the same or lower than the glass at the desired operating conditions. In one embodiment, the metal pin is a commercially available pin, referred to as a Paliney® 7 pin, with the approximate composition of 34% Pd, 30% Ag, 10% Pt, 10% Au, 15% Cu and less than 1% Zn. In another embodiment, the metal pin is a commercially available pin, referred to as a Paliney® 6 pin, with the approximate composition of 43-45% Pd, approximately 37-39% Ag, approximately 0.8-1.2% Pt, approximately 15-17% Cu and less than or equal to 1.2% Ni. In one embodiment, these pins have a hardness of greater than or equal to 300 Knoop after heat treatment incorporated into the sealing cycle. The metal pin can also be comprised of 330 or 333 stainless steel.

The metal housing can be any metal that has a CTE that is equivalent to or higher than the CTE of the glass at the temperature of use, where the CTE is determined by testing using a standard test method such as dilatometry. For example, the glass ceramic material disclosed herein has a CTE in the range of approximately $120 \times 10^{-7}$ to $200 \times 10^{-7}$ in/in/° C. In one embodiment, the metal is 304L stainless steel.

Producing the glass-ceramic to metal seal connector requires a glass preform with the glass composition as disclosed herein, a metal pin and a metal housing or casing where these components are assembled and processed at elevated temperature to reflow the glass and crystallize it to join the glass to the pin and to the metal housing. The pin hardness is maintained or increased by an appropriate heat treatment during this procedure.

The degree of glass crystallization can be modified by varying the processing parameters (time and temperature profile during cooling after the glass is melted). Different thermal profiles can also be used to tailor the coefficient of thermal expansion of the glass-ceramic material. This option allows thermal strain behavior of the glass ceramic to match or be controllably different than those of the metal housing and pin material. In one embodiment, a glass-ceramic material was prepared with a CTE between that of the 304L stainless steel housing (with a CTE of approximately 18 ppm/° C.) and a Paliney® 7 material pin (with a CTE of approximately 14-15 ppm/° C.).

The hermeticity of the seal can be checked using standard methods such as with a helium leak detection system. In one embodiment, the seal hermeticity is robust enough such that the measured leak rate is below $1 \times 10^{-8}$ cubic centimeters (CC) of helium per second. The leak rate is low enough so as to be undetectable with the leak measuring equipment which has a detectability limit in the range of $1 \times 10^{-9}$ to $1 \times 10^{-10}$ CC of He per sec. The leak detection equipment was calibrated with a NIST traceable standard with a known leak of $10^{-8}$ CC of He per sec.

In preparing the glass-ceramic sealing glasses of the disclosed compositional range, the batch ingredient powder raw materials are intimately mixed by hand or in a commercially available blender, and heated to such temperatures while stirring that all of the raw materials are converted to either glass-forming or glass-modifying oxides, thereby enabling the formation of a glass from a homogeneous melt. Generally, the batch ingredients are mixed well in a blender, and melting is done in a 100% platinum crucible or a 90% platinum-10% rhodium crucible in an electric furnace at a temperature of about 1550° C. in air of less than 25% relative humidity with continuous stirring. After stirring for about 15 hr the glass is fined, i.e., trapped bubbles are allowed to float to the top of the molten glass where they burst.

The batch materials employed for preparing the glasses of the present invention are of a high purity and selected from commercially available materials. The components of the batch can be in the form of functionally equivalent phosphates, carbonates, borates or any other form that does not adversely affect the subject glass composition.

Glass having a composition as described above, prepared by the melting together of the components of a batch will not, by simple cooling to solidification, possess the necessary CTE that will match that of the nickel base, stainless steel alloys, or copper to which it is intended to be sealed. In order to obtain the desired CTE in the final glass ceramic seal, the glass can be subjected to a heat treatment process in either a belt furnace or a batch process by first melting the glass, allowing it to flow and wet the metal components, and crystallizing $Li_3PO_4$ from the fluid above 950° C., which is accomplished while the glass travels through the furnace sealing zone; The crystalline glass ceramic is held at approximately 950-1050° C., for 5-60 min, in an inert atmosphere, thereby creating $Li_3PO_4$, which nucleates cristobalite, and forms a bond between the glass ceramic and metal components, while the glass, metal components, and/or fixturing travel through the hot zone of the furnace. The glass is then cooled to about 750-775° C. at a controlled rate of about 5-25° C./min, causing crystallization of lithium silicates and growth of cristobalite. This is followed by cooling to about 580° C. at a rate of about 25° C./min, producing glass ceramic material of the desired CTE, and then cooled further to room temperature at about 5-25° C./min.

The glass-ceramic to metal seal connector of the present invention remains hermetic after exposure to high temperature and pressure. Single and multiple pin seals formed using the disclosed materials have been shown to remain hermetic at temperatures above 200° C. up to temperatures of approximately 700° C. The seals have also been shown to remain hermetic at pressures up to 500 psi, even at temperatures of 700° C. In one embodiment, a hermetic and electrical connection was maintained at approximately 700° C. at a pressure of 500 psi for over 15 minutes. Thus, the connectors function and the seals remain hermetic above the glass-transition temperature of the parent glass composition ($T_g$ ~450° C.) and above the $T_g$ of many commercial glasses.

Example. Electrical connectivity and hermeticity of 28 glass-ceramic to metal seal connectors at elevated temperature and pressure.

A set of 28 samples was tested for their capability to maintain hermetic electrical connectivity at elevated temperatures and pressures. The glass-ceramic to metal connector used was composed of a Paliney® 7 pin encased in the glass ceramic material composition disclosed herein within a 304L stainless steel housing. The samples were tested at temperatures greater than 500° C. and 500 psi. Of the 28 samples tested, 27 samples maintained hermeticity with no visually observable cracking. The sample that did fail had an irregular geometry due to out-of-specification glass-ceramic recess, which altered the stress state in the sample.

Although the invention has been described with reference to one or more particular embodiments, this description is not meant to be construed in a limiting sense. Various modifications of the disclosed embodiments as well as alternative embodiments of the invention will become apparent to persons skilled in the art. It is therefore contemplated that the appended claims will cover any such modification or embodiments that fall within the scope of the invention. The entire disclosures of all references, applications, patents and publications cited above are hereby incorporated by reference.

We claim:

1. A method of providing a hermetic, electrical connection between two electrical components at a temperature greater than 200° C. comprising mating at least one metal pin in a glass-ceramic to metal seal connector to two electrical components and maintaining a hermetic, electrical connection between said two electrical components at a temperature greater than 200° C., wherein said glass-ceramic to metal seal connector comprises the at least one metal pin encased in a glass-ceramic material inside of a metal housing, said glass-ceramic material comprised of 65-80% $SiO_2$, 8-16% $Li_2O$, 2-8% $Al_2O_3$, 1-5% $P_2O_5$, 1-8% $K_2O$, 0.5-7% $B_2O_3$, and 0-5% ZnO, and wherein the at least one metal pin comprises a palladium-based alloy.

2. The method of claim 1 wherein said hermetic, electrical connection is maintained for a time period greater than 15 minutes at the temperature greater than 200° C.

3. The method of claim 2 wherein said hermetic, electrical connection is maintained at a temperature greater than 200° C. and at a pressure greater than 300 psi.

4. The method of claim 1 wherein said hermetic, electrical connection is maintained at a temperature greater than the glass transition temperature of the glass-ceramic material and less than approximately 700° C.

5. The method of claim 1 wherein the palladium-based alloy comprises a composition of approximately 34% Pd, approximately 30% Ag, approximately 10% Pt, approximately 10% Au, approximately 15% Cu and less than or equal to 1% Zn.

6. The method of claim 1 wherein the palladium-based alloy comprises a composition of approximately 43-45% Pd, approximately 37-39% Ag, approximately 0.8-1.2% Pt, approximately 15-17% Cu and less than or equal to 1.2% Ni.

7. The method of claim 1 wherein said metal housing comprises a stainless steel material.

8. The method of claim 1 wherein said metal housing comprises 304L stainless steel.

9. The method of claim 5 wherein said at least one metal pin has a hardness greater than approximately 300 Knoop.

10. The method of claim 1 wherein the coefficient of thermal expansion of the at least one metal pin is approximately the same or less than the coefficient of thermal expansion of the glass-ceramic material.

11. The method of claim 7 wherein the coefficient of thermal expansion of the metal housing is approximately the same or greater than the coefficient of thermal expansion of the glass-ceramic material.

* * * * *